United States Patent
Veronesi

(10) Patent No.: US 12,456,273 B2
(45) Date of Patent: Oct. 28, 2025

(54) ULTRASOUND IMAGING SYSTEM AND METHOD FOR GENERATING AND DISPLAYING A COLORIZED SURFACE RENDERING

(71) Applicant: GE Precision Healthcare LLC, Wauwatosa, WI (US)

(72) Inventor: Federico Veronesi, San Lazzaro di Savena (IT)

(73) Assignee: GE Precision Healthcare LLC, Wauwatosa, WI (US)

( * ) Notice: Subject to any disclaimer, the term of this patent is extended or adjusted under 35 U.S.C. 154(b) by 362 days.

(21) Appl. No.: 18/071,293

(22) Filed: Nov. 29, 2022

(65) Prior Publication Data

US 2024/0177437 A1    May 30, 2024

(51) Int. Cl.
*G06T 19/20*  (2011.01)
*G06T 15/08*  (2011.01)

(52) U.S. Cl.
CPC .............. *G06T 19/20* (2013.01); *G06T 15/08* (2013.01); *G06T 2210/41* (2013.01)

(58) Field of Classification Search
CPC ..... G06T 15/08; G06T 19/20; G06T 2210/41; G06T 15/005; A61B 8/4444; A61B 8/461; A61B 8/06; A61B 8/483; A61B 8/488; A61B 8/5215; G06F 3/147
See application file for complete search history.

(56) References Cited

U.S. PATENT DOCUMENTS

| | | | | |
|---|---|---|---|---|
| 6,458,082 B1 * | 10/2002 | Jackson | ............... | A61B 8/523 600/441 |
| 2007/0239001 A1 * | 10/2007 | Mehi | ................... | G10K 11/346 600/437 |
| 2011/0317881 A1 * | 12/2011 | Bonnefous | ............ | A61B 6/481 340/384.1 |
| 2012/0226163 A1 * | 9/2012 | Moehring | .............. | A61B 5/725 600/454 |
| 2018/0214128 A1 * | 8/2018 | Holländer | ........... | A61B 8/5207 |

(Continued)

OTHER PUBLICATIONS

Boris Tutschek, "173—Three-Dimensional Ultrasound: Techniques and Clinical Applications" Obstetric Imaging: Fetal Diagnosis and Care (Second Edition), pp. 713-721.e1, Sep. 5, 2017, 9 pages.

(Continued)

*Primary Examiner* — Phi Hoang

(57) ABSTRACT

An ultrasound imaging system and method for rendering volumetric ultrasound data. The method includes accessing, with a processor, an anatomical ultrasound dataset including a volume-of-interest. The method includes, accessing, with the processor, a functional ultrasound dataset including the volume-of-interest. The method includes identifying, with the processor, an anatomical surface from the anatomical ultrasound dataset, wherein the anatomical surface is a three-dimensional non-planar surface. The method includes generating, with the processor, a colorized surface rendering of the anatomical surface, wherein the colorized surface rendering is colorized to represent information from the functional ultrasound dataset. The method includes displaying the colorized surface rendering on a display device.

18 Claims, 13 Drawing Sheets
(4 of 13 Drawing Sheet(s) Filed in Color)

(56) References Cited

U.S. PATENT DOCUMENTS

2020/0121294 A1\* 4/2020 Tsymbalenko ....... A61B 8/5246
2020/0155121 A1\* 5/2020 Kwon ...................... A61B 8/54

OTHER PUBLICATIONS

Chaoui et al., "Three-dimensional (3D) and 4D color Doppler fetal echocardiography using spatio-temporal image correlation" (STIC) Ultrasound Obstet Gynecol 2004; 23: 535-545, May 6, 2004, 11 pages.
Leung et al., "Update on Color Flow Imaging in Obstetrics", Life 2022, 12, 226. https://doi.org/10.3390/life12020226, Jan. 31, 2022, 21 pages.
Støylen, "Basic ultrasound for clinicians", Norwegian University of Science and Technology, Jun. 2016, accessed on Internet on Feb. 24, 2023 [https://folk.ntnu.no/stoylen/strainrate/Basic_ultrasound], 47 pages.

\* cited by examiner

ULTRASOUND IMAGING SYSTEM AND METHOD FOR GENERATING AND DISPLAYING A COLORIZED SURFACE RENDERING

FIELD OF THE INVENTION

This disclosure relates generally to an ultrasound imaging system and method for generating and displaying a colorized surface rendering to represent both anatomical ultrasound data and functional ultrasound data.

BACKGROUND OF THE INVENTION

Ultrasound imaging is commonly used to acquire both anatomical ultrasound data, such as B-mode data, and functional ultrasound data. Color flow Doppler data is one example of commonly-acquired functional ultrasound data. As part of many clinical procedures, it is desirable to attain a clear visualization and understanding of the functional ultrasound data and how the functional ultrasound data relates to anatomical structures present in the anatomical ultrasound data.

Using conventional ultrasound techniques, it is difficult for clinicians to obtain a clear understanding of functional ultrasound data with respect to structures present in the anatomical ultrasound dataset, particularly when the datasets are volumetric datasets, such as three-dimensional (3D) ultrasound datasets or four-dimensional (4D) ultrasound datasets.

One clinical application that involves the use and visualization of both anatomical ultrasound data and functional ultrasound data is the visualization and detection of a regurgitant jet. To identify a regurgitant jet, both an anatomical ultrasound dataset and a functional ultrasound dataset are acquired. The anatomical ultrasound dataset is typically a B-mode dataset including a volume-of-interest and the functional ultrasound dataset is typically a color flow Doppler dataset including the volume-of-interest. The anatomical ultrasound dataset and the functional ultrasound dataset are typically both four-dimensional ultrasound datasets according to most conventional techniques.

Three-dimensional or four-dimensional ultrasound datasets may conventionally be visualized with either volume-rendering or by viewing one or more slices representing a plane through the dataset. Volume-rendering involves displaying a two-dimensional projection of a three-dimensional dataset. Generating a single volume-rendering that includes both anatomical ultrasound data and functional ultrasound data, as is known by conventional techniques, is challenging because structures/flow rendered in the foreground with respect to the viewer can either completely or partially hide information from structures or flows rendered in the background with respect to the viewer. For example, rendered tissue that is in the foreground can partially or completely block flow and/or tissue information that is located in the background with respect to the viewer. Likewise, rendered flow information, from the functional ultrasound dataset, may partially or completely block information from structures and/or flows that are located in the background with respect to the viewer. This makes it very difficult for the clinician to accurately understand information from both the anatomical ultrasound dataset and the functional ultrasound dataset.

Generating one or more slices representing both anatomical ultrasound data and functional ultrasound data is another conventional approach for visualizing anatomical and functional ultrasound data. While viewing the data as one or more two-dimensional slices solves the problem of having structures/flow closer to the viewer obscuring information further from the viewer, it introduces some other limitations. For example, generating one or more slices only shows data from a single plane. Anatomical structures are typically not all located on a single plane. As such, it is difficult for the clinician to fully understand both the complete anatomical structure and the functional ultrasound data values with respect to the anatomical structures while viewing the anatomical ultrasound data and the functional ultrasound data as two-dimensional images.

One application involving both anatomical ultrasound data and functional ultrasound data is the visualization of regurgitant valves. When visualizing regurgitant valves, the clinician is interested in the anatomical structure of interest, which is typically a cardiac valve, the surrounding tissue adjacent to the valve, and the position and size of the regurgitant jet with respect to the cardiac valve. The visualization of the cardiac valve and the surrounding structure is typically generated based on B-mode data, and the visualization of the jet is generated based on color flow Doppler data. Using a conventional technique, such as volume rendering or rendering one or more two-dimensional slices, includes the limitations discussed previously. Conventional techniques for visualizing and displaying both anatomical ultrasound data and functional ultrasound data make it hard for a clinician to accurately determine the size and position of the regurgitant jet with respect to surrounding anatomical tissue, such as the cardiac valve.

For at least these reasons, there is a need for an improved method and ultrasound imaging system for rendering volumetric ultrasound data from both an anatomical ultrasound dataset and a functional ultrasound dataset.

BRIEF DESCRIPTION OF THE INVENTION

The patent or application file contains at least one drawing executed in color. Copies of this patent or patent application publication with color drawing(s) will be provided by the Office upon request and payment of the necessary fee.

The above-mentioned shortcomings, disadvantages and problems are addressed herein which will be understood by reading and understanding the following specification.

In an embodiment, a method for rendering volumetric ultrasound data includes accessing, with a processor, an anatomical ultrasound dataset including a volume-of-interest. The method includes accessing, with the processor, a functional ultrasound dataset including the volume-of-interest. The method includes identifying, with the processor, an anatomical surface from the anatomical ultrasound dataset, wherein the anatomical surface is a three-dimensional non-planar surface. The method includes generating, with the processor, a colorized surface rendering of the anatomical surface, wherein the colorized surface rendering is colorized to represent information from the functional ultrasound dataset. The method includes displaying the colorized surface rendering on a display device.

In an embodiment, an ultrasound imaging system includes an ultrasound probe, a display device, and a processor in electronic communication with both the ultrasound probe and the display device. The processor is configured to access an anatomical ultrasound dataset including a volume-of-interest. The processor is configured to access a functional ultrasound dataset including a volume-of-interest. The processor is configured to identify an anatomical surface from the anatomical ultrasound dataset, wherein the anatomical surface is a three-dimensional non-planar surface. The processor is configured to generate a colorized surface rendering of the anatomical surface, wherein the colorized surface rendering is colorized to represent information from the functional ultrasound dataset. The processor is configured to display the colorized surface rendering on the display device.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized, and that logical, mechanical, electrical and other changes may be made without departing from the scope of the embodiments. The following detailed description is, therefore, not to be taken as limiting the scope of the invention.

Figure 1:
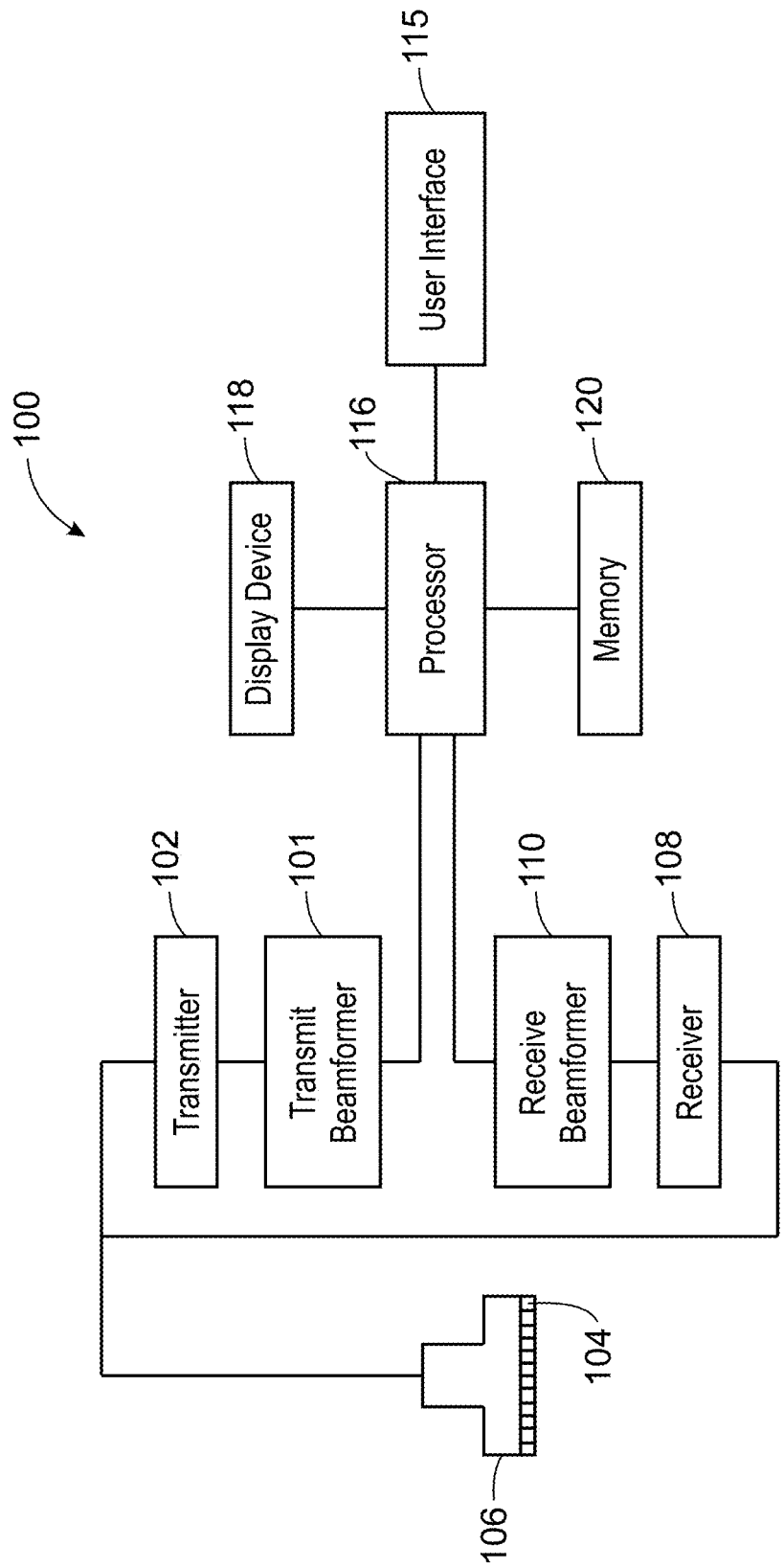
FIG. 1 is a schematic diagram of an ultrasound imaging system in accordance with an embodiment.

FIG. 1 is a schematic diagram of an ultrasound imaging system 100 in accordance with an embodiment. The ultrasound imaging system 100 includes a transmit beamformer 101 and a transmitter 102 that drive elements 104 within an ultrasound probe 106 to emit pulsed ultrasonic signals into a body (not shown) through one or more transmit events. The ultrasound probe 106 may be any type of ultrasound probe capable of a 3D or 4D acquisition. For example, the ultrasound probe 106 may be a 2D matrix array probe, a mechanical 3D/4D probe, or any other type of ultrasound probe configured to acquire volumetric ultrasound data. Still referring to FIG. 1, the pulsed ultrasonic signals are back-scattered from structures in the body, like blood cells or muscular tissue, to produce echoes that return to the elements 104. The echoes are converted into electrical signals by the elements 104 and the electrical signals are received by a receiver 108. The electrical signals representing the received echoes are passed through a receive beamformer 110 that outputs ultrasound data. According to some embodiments, the probe 106 may contain electronic circuitry to do all or part of the transmit beamforming and/or the receive beamforming. For example, all or part of the transmit beamformer 101, the transmitter 102, the receiver 108 and the receive beamformer 110 may be situated within the ultrasound probe 106. The terms "scan" or "scanning" may also be used in this disclosure to refer to acquiring data through the process of transmitting and receiving ultrasonic signals. The terms "data" and "ultrasound data" may be used in this disclosure to refer to either one or more datasets acquired with an ultrasound imaging system. A user interface 115 may be used to control operation of the ultrasound imaging system 100. The user interface 115 may be used to control the input of patient data, or to select various modes, operations, parameters, and the like. The user interface 115 may include one or more user input devices such as a keyboard, hard keys, a touch pad, a touch screen, a track ball, rotary controls, sliders, soft keys, or any other user input devices.

The ultrasound imaging system 100 also includes a processor 116 to control the transmit beamformer 101, the transmitter 102, the receiver 108 and the receive beamformer 110. The user interface 115 is in electronic communication with the processor 116. The processor 116 may include one or more central processing units (CPUs), one or more microprocessors, one or more microcontrollers, one or more graphics processing units (GPUs), one or more digital signal processors (DSP), and the like. According to some embodiments, the processor 116 may include one or more GPUs, where some or all of the one or more GPUs include a tensor processing unit (TPU). According to embodiments, the processor 116 may include a field-programmable gate array (FPGA), or any other type of hardware capable of carrying out processing functions. The processor 116 may be an integrated component or it may be distributed across various locations. For example, according to an embodiment, processing functions associated with the processor 116 may be split between two or more processors based on the type of operation. For example, embodiments may include a first processor configured to perform a first set of operations and a second, separate processor to perform a second set of operations. According to embodiments, one of the first processor and the second processor may be configured to implement a neural network. The processor 116 may be configured to execute instructions accessed from a memory. According to an embodiment, the processor 116 is in electronic communication with the ultrasound probe 106, the receiver 108, the receive beamformer 110, the transmit beamformer 101, and the transmitter 102. For purposes of this disclosure, the term "electronic communication" may be defined to include both wired and wireless connections. The processor 116 may control the ultrasound probe 106 to acquire ultrasound data. The processor 116 controls which of the elements 104 are active and the shape of a beam emitted from the ultrasound probe 106. The processor 116 is also in electronic communication with a display device 118, and the processor 116 may process the ultrasound data into images for display on the display device 118. According to embodiments, the processor 116 may also include a complex demodulator (not shown) that demodulates the RF data and generates raw data. In another embodiment, the demodulation can be carried out earlier in the processing chain. The processor 116 may be adapted to perform one or more processing operations according to a plurality of selectable ultrasound modalities on the data. The data may be processed in real-time during a scanning session as the echo signals are received. The processor 116 may be configured to scan-convert the ultrasound data acquired with the ultrasound probe 106 so it may be displayed on the display device 118. Displaying ultrasound data in real-time may involve displaying images based on the ultrasound data without any intentional delay. For example, the processor 116 may display each updated image frame as soon as each updated image frame of ultrasound data has been acquired and processed for display during the process of an ultrasound procedure. Real-time frame rates may vary based on the size of the region or volume from which data is acquired and the specific parameters used during the acquisition. According to other embodiments, the data may be stored temporarily in a buffer (not shown) during a scanning session and processed in less than real-time. According to embodiments that include a software beamformer, the functions associated with the transmit beamformer 101 and/or the receive beamformer 110 may be performed by the processor 116.

According to various embodiments, the components illustrated in FIG. 1 may be part of a distributed ultrasound imaging system. For example, one or more of the processor 116, the user interface 115, the transmitter 102, the transmit beamformer 101, the receive beamformer 110, the receiver 108, a memory 120, and the display device 118 may be located remotely from the ultrasound probe 106. The aforementioned components may be located in different rooms or different facilities according to various embodiments. For example, the probe 106 may be used to acquire ultrasound data from the patient and then transmit the ultrasound data, via either wired or wireless techniques, to the processor 116.

According to an embodiment, the ultrasound imaging system 100 may continuously acquire ultrasound data at a volume rate of, for example, 10 Hz to 30 Hz. Images generated from the data may be refreshed at a similar frame-rate. Other embodiments may acquire and display data at different rates. For example, some embodiments may acquire ultrasound data at a volume rate of less than 10 Hz or greater than 30 Hz depending on the size of each frame of data and the parameters associated with the specific application. The memory 120 is included for storing processed frames of acquired data. In an exemplary embodiment, the memory 120 is of sufficient capacity to store frames of ultrasound data acquired over a period of time at least several seconds in length. The frames of data are stored in a manner to facilitate retrieval thereof according to its order or time of acquisition. The memory 120 may comprise any known data storage medium.

In various embodiments of the present invention, data may be processed by other or different mode-related modules by the processor 116 (e.g., B-mode, color flow Doppler, M-mode, color M-mode, spectral Doppler, Elastography, TVI, strain, strain rate, and the like) to form 2D or 3D data. For example, one or more modules may generate B-mode, color flow Doppler, M-mode, color M-mode, spectral Doppler, Elastography, TVI, strain, strain rate and combinations thereof, and the like. The image beams and/or frames are stored, and timing information indicating a time at which the data was acquired in memory may be recorded. The modules may include, for example, a scan conversion module to perform scan conversion operations to convert the image frames from beam space coordinates to display space coordinates. A video processor module may be provided that reads the image frames from a memory, such as the memory 120, and displays the image frames in real-time while a procedure is being carried out on a patient. The video processor module may store the image frames in an image memory, from which the images are read and displayed.

Figure 2:
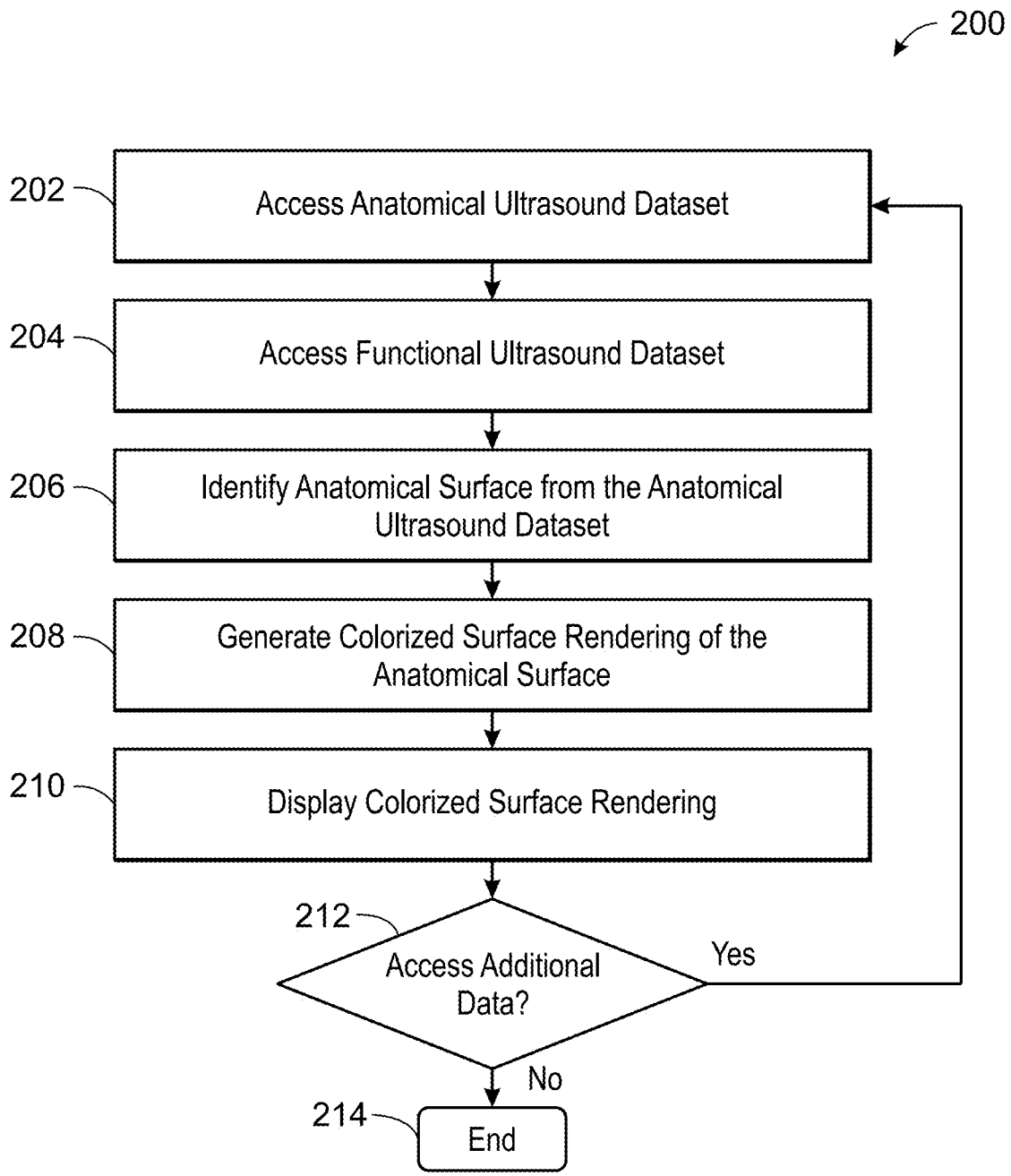
FIG. 2 is a flow chart of a method in accordance with an embodiment.

FIG. 2 is a flow chart of a method 200 in accordance with an exemplary embodiment. The individual blocks of the flow chart represent steps that may be performed in accordance with the method 200. Additional embodiments may perform the steps shown in a different sequence and/or additional embodiments may include additional steps not shown in FIG. 2. The technical effect of the method 200 is the generation and display of a colorized surface rendering of an anatomical surface, wherein the colorized surface rendering is colorized to represent information from the functional ultrasound dataset. The method 200 will be described according to an embodiment where it is performed with the ultrasound imaging system 100 shown in FIG. 1. However, it should be appreciated by those skilled in the art that the method 200 may be performed with other ultrasound imaging systems according to various embodiments. The method 200 will be described in detail hereinafter.

At step 202, the processor 116 accesses an anatomical ultrasound dataset. The anatomical ultrasound dataset is a volume dataset and includes a volume-of-interest. The anatomical ultrasound dataset may be a B-mode ultrasound dataset including B-mode ultrasound data according to an exemplary embodiment. According to other embodiments, the anatomical ultrasound dataset may include a different type of anatomical ultrasound data. According to an embodiment, the processor 116 may access the anatomical ultrasound dataset in real-time as anatomical ultrasound data is being acquired with the ultrasound probe 106. For example, the anatomical ultrasound dataset may be acquired by controlling the ultrasound probe 106 to acquire anatomical ultrasound data. According to other embodiments, the processor 116 may access a previously acquired anatomical ultrasound dataset. For example, the processor 116 may access the anatomical ultrasound dataset from the memory 120 or from an external storage device or server, such as a Picture Archiving and Communications System (PACS), an external memory device, or any other storage device configured to save or store an anatomical ultrasound dataset.

At step 204, the processor 116 accesses a functional ultrasound dataset. The functional ultrasound dataset is a volume dataset and includes the volume-of-interest as well. The functional ultrasound dataset may be a color flow Doppler dataset according to an exemplary embodiment. According to other embodiments, the function ultrasound dataset may include a different type of functional ultrasound data, such as blood speckle imaging (BSI), strain, or any other type of functional ultrasound data. According to an embodiment, the processor 116 may access the functional ultrasound dataset in real-time as the functional ultrasound data is being acquired. For example, the functional ultrasound dataset may be acquired by controlling the ultrasound probe 106 to acquire functional ultrasound data. According to other embodiments, the processor 116 may access a previously acquired functional ultrasound dataset. For example, the processor 116 may access the functional ultrasound dataset from the memory 120 or from an external storage device or server, such as a Picture Archiving and Communications System (PACS), an external memory device, or any other storage device configured to save or store an anatomical ultrasound dataset.

According to various embodiments, the processor 116 may be configured to interleave the acquisitions of anatomical ultrasound data that is part of the anatomical ultrasound dataset and functional ultrasound data that is part of the functional ultrasound dataset. For example, the processor 116 may control the ultrasound probe 106 to alternate between acquiring anatomical ultrasound data and functional ultrasound data as is known by those skilled in the art. Accessing the anatomical ultrasound dataset at step 202 may include accessing either one or more complete volumes of anatomical ultrasound data or one or more partial volumes of anatomical ultrasound data; and accessing the functional ultrasound dataset at step 204 may include accessing one or more full volumes of functional ultrasound data or one or more partial volumes of functional ultrasound data.

The method 200 will be described according to an exemplary embodiment where the anatomical ultrasound dataset is a B-mode ultrasound dataset and the functional ultrasound dataset is a color flow Doppler dataset. Additionally, according to an exemplary embodiment, the volume-of-interest included in both the anatomical ultrasound dataset and the functional ultrasound dataset includes a cardiac valve. It should be appreciated that according to other embodiments, one or more of the following conditions may apply: the anatomical ultrasound dataset may include a different mode of ultrasound data; the functional ultrasound dataset may include a different mode of ultrasound data; and/or the volume-of-interest may be different.

Figure 3:
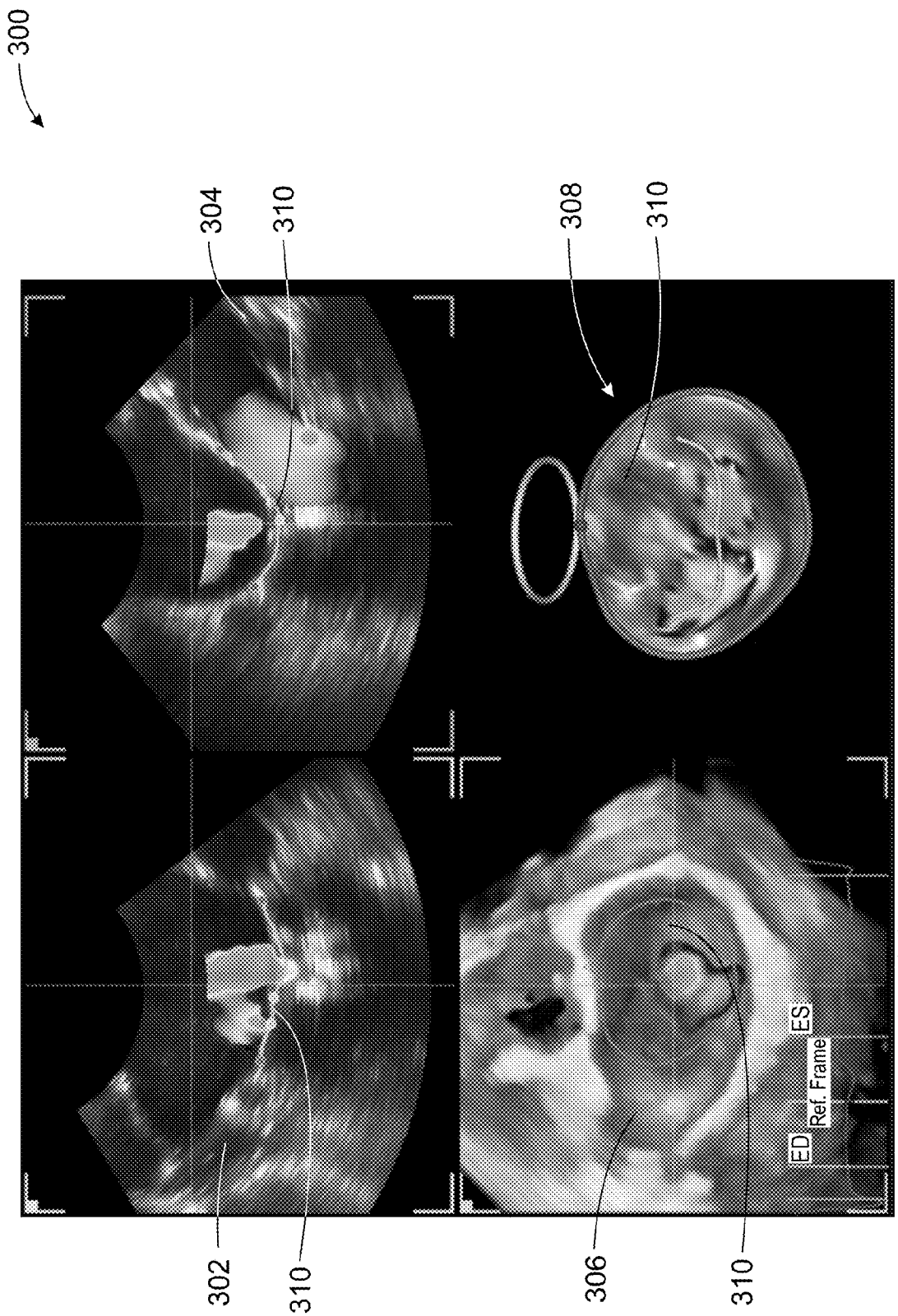
FIG. 3 is a representation of a screenshot in accordance with an embodiment.

FIG. 3 is a representation of a screenshot 300 in accordance with an exemplary embodiment. The screenshot 300 includes four images generated using both the anatomical ultrasound dataset and the functional ultrasound dataset. The screenshot 300 includes a first 2D image 302, a second 2D image 304, a volume rendering 306, and a colorized surface rendering 308. According to an exemplary embodiment, the screenshot 300 represents four images that may be displayed during an ultrasound examination. Each of the four images may be a real-time ultrasound image that is refreshed as additional ultrasound anatomical ultrasound data and additional functional ultrasound data are acquired. The first 2D image 302, the second 2D image 304, and the volume rendering 306 are conventional ultrasound image formats that are well-known by those skilled in the art. The colorized surface rendering 308 is not a conventional ultrasound imaging format and will be described in additional detail hereinafter.

At step 206, the processor 116 identifies an anatomical surface 310 from the anatomical ultrasound dataset. The anatomical surface 310 is a three-dimensional non-planar surface. The anatomical surface may be a heart valve surface. In FIG. 3, the anatomical surface 310 is the surface of a mitral valve, which is a type of cardiac valve. The processor 116 may be configured to automatically identify the anatomical surface 310. Or, according to other embodiments, the processor 116 may receive an input from the user interface 115 identifying at least a portion of the anatomical surface 310. According to various embodiments, the processor 116 may be configured to automatically identify the anatomical surface 310 from the anatomical ultrasound dataset using the portion of the surface that was identified based on an input by a user via the user interface 115. For example, the user may identify a portion of the anatomical surface 310 in one or more of the first 2D image 302, the second 2D image 304, and/or the volume rendering 306.

According to various embodiments, the processor 116 may identify an anatomical surface, such as the anatomical surface 310, through a thresholding technique, a shape-matching technique, an artificial intelligence technique, any combination of the aforementioned techniques, or by any other technique configured to identify the anatomical surface. Artificial intelligence techniques implemented by the processor 116 may include machine learning techniques, deep learning techniques, such as the use of a convolutional neural network (CNN), or any other artificial intelligence technique. As discussed previously, the processor 116 may be configured to receive an input from the user interface 115 identifying a portion of the anatomical surface 310 and then the processor 116 may identify the rest of the anatomical surface 310 using one or more other techniques such as a thresholding technique, a shape-matching technique, and/or an artificial intelligence technique. For example, the user may select, via the user interface 115, the anatomical surface 310 by clicking on the anatomical surface 310, identifying a contour of the anatomical surface 310, highlighting/identifying a portion of the anatomical surface 310, or any other way of designating some or all of the anatomical surface 310. Then the processor 116 may be configured to identify the rest of the anatomical surface 310 automatically. According to other embodiments, the processor 116 may be configured to identify all of the anatomical surface 310 automatically without the user identifying a portion of the anatomical surface 310. According to some embodiments, the user may provide an input to the processor 116 identifying a name of the anatomical surface 310 that the user would like the processor 116 to identify. As discussed previously with respect to FIG. 3, the anatomical surface 310 identified at step 206 may correspond to the mitral valve surface of the patient's anatomy or any other surface in the patient's body. According to other embodiments, the anatomical surface may correspond to a different anatomical structure. For example, the anatomical surface may be a different valve, a cardiac chamber wall, or any other anatomical structure. According to an embodiment where the anatomical surface is a cardiac chamber wall, the method may be used to identify or detect flow through the cardiac chamber walls. For instance, the method may be used to detect an atrial septal defect or a ventricular septal defect.

According to some embodiments, the processor 116 may segment the anatomical surface 310 from the anatomical ultrasound dataset. For example, the processor 116 may be configured to use a segmentation algorithm, such as the 4D Auto MVQ segmentation algorithm, or any other segmentation algorithm. According to other embodiments, the processor 116 may identify the anatomical surface 310 within the anatomical ultrasound dataset without segmenting the anatomical surface 310 from the anatomical ultrasound dataset.

At step 208, the processor 116 generates a colorized surface rendering of the anatomical surface 310 identified at step 206. According to an exemplary embodiment, the processor 116 may generate the colorized surface rendering 308 shown in FIG. 3. The colorized surface rendering 308 represents the three-dimensional form of the anatomical surface 310 identified from the anatomical ultrasound dataset. The colorized surface rendering 308 also includes colorization to represent data from the functional ultrasound dataset. In other words, the three-dimensional form or shape of the colorized surface rendering 308 represents the anatomical surface 310 identified from the anatomical ultrasound dataset and the colorization of the colorized surface rendering 308 represents information from the functional ultrasound dataset. Additional details about the generation of the colorized surface rendering 308 will be provided hereinafter.

Figure 4:
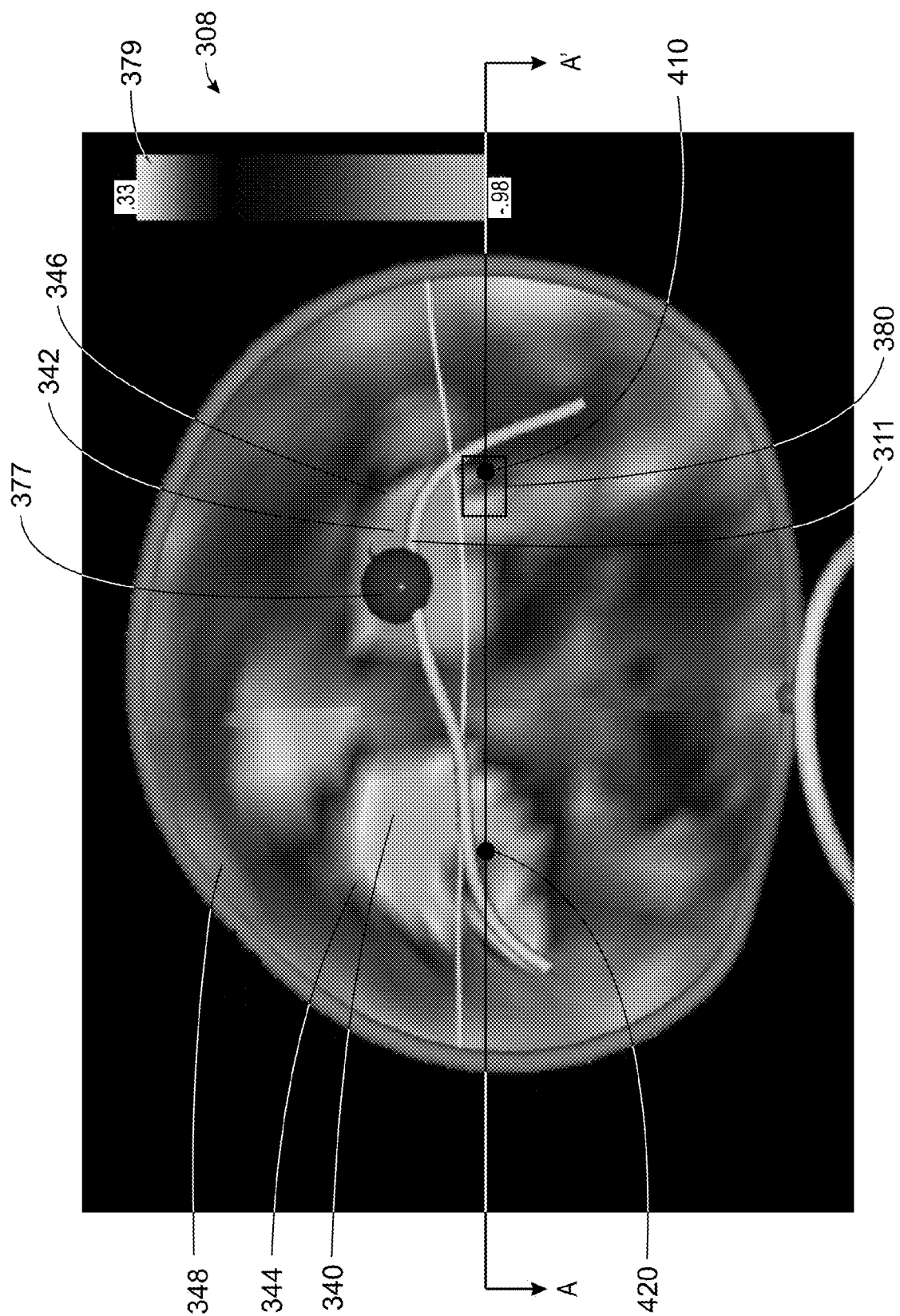
FIG. 4 is a representation of a colorized surface rendering in accordance with an embodiment.
Figure 5:
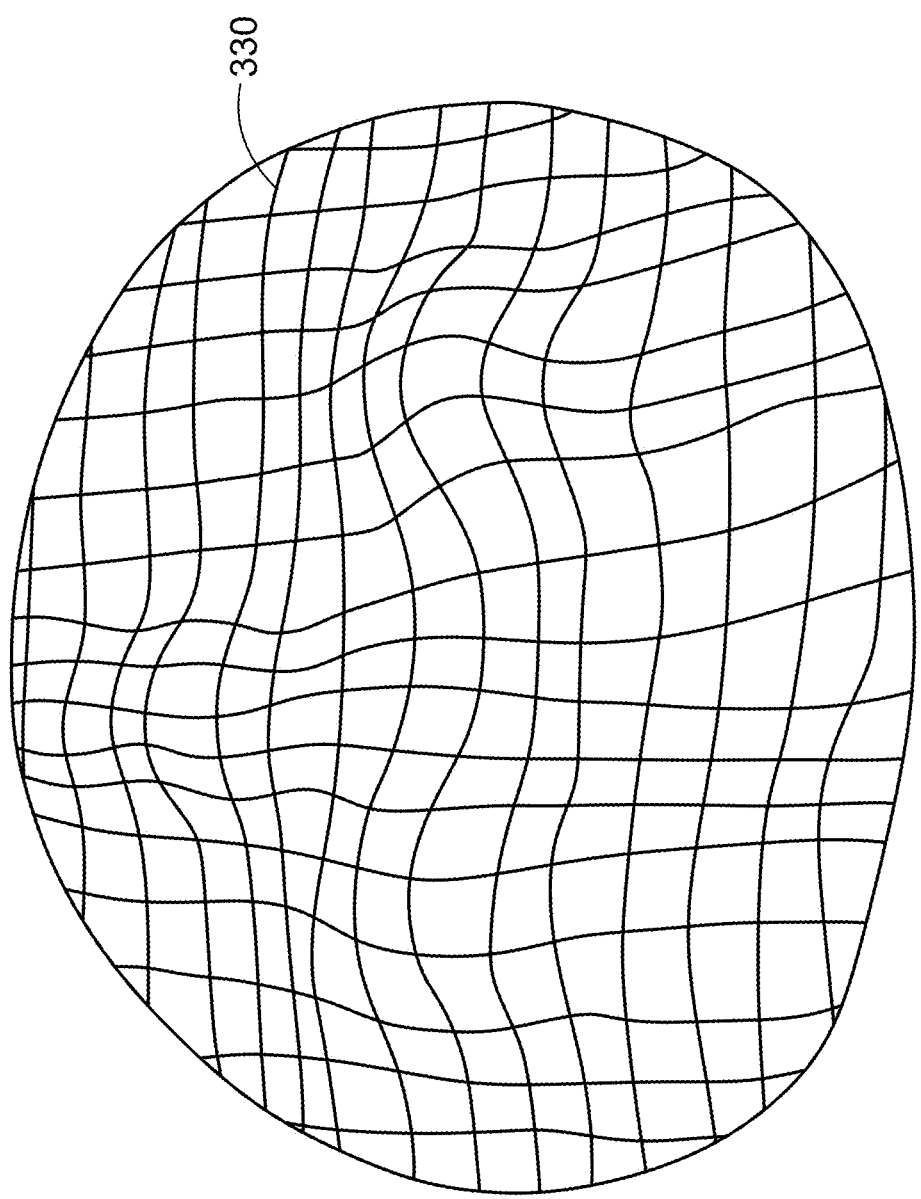
FIG. 5 is a representation of a wireframe in accordance with an embodiment.

FIG. 4 is an enlarged view of the colorized surface rendering 308 shown in FIG. 3. The colorized surface rendering 308 in FIG. 4 is shown from a first view direction. The first view direction used in the display of FIG. 4 is the same as the view direction this is used in the display of the colorized surface rendering 308 shown in FIG. 3. FIG. 5 is a representation of a wireframe 330 of the anatomical surface 310 from the same view direction as shown in FIG. 4. The wireframe 330 helps to show the three-dimensional shape of the anatomical surface 310. According to some embodiments, the processor 116 may generate a wireframe, such as the wireframe 330, of the anatomical surface as an output of step 206. According to other embodiments, the processor 116 may generate a different type of wireframe or a mesh as an output to step 206 as part of identifying the anatomical surface from the anatomical ultrasound dataset. The processor 116 may identify the anatomical surface using other techniques according to various other embodiments. The wireframe 330 helps to show the three dimensional shape of the anatomical surface 310 represented by the colorized surface rendering 308.

Figure 6:
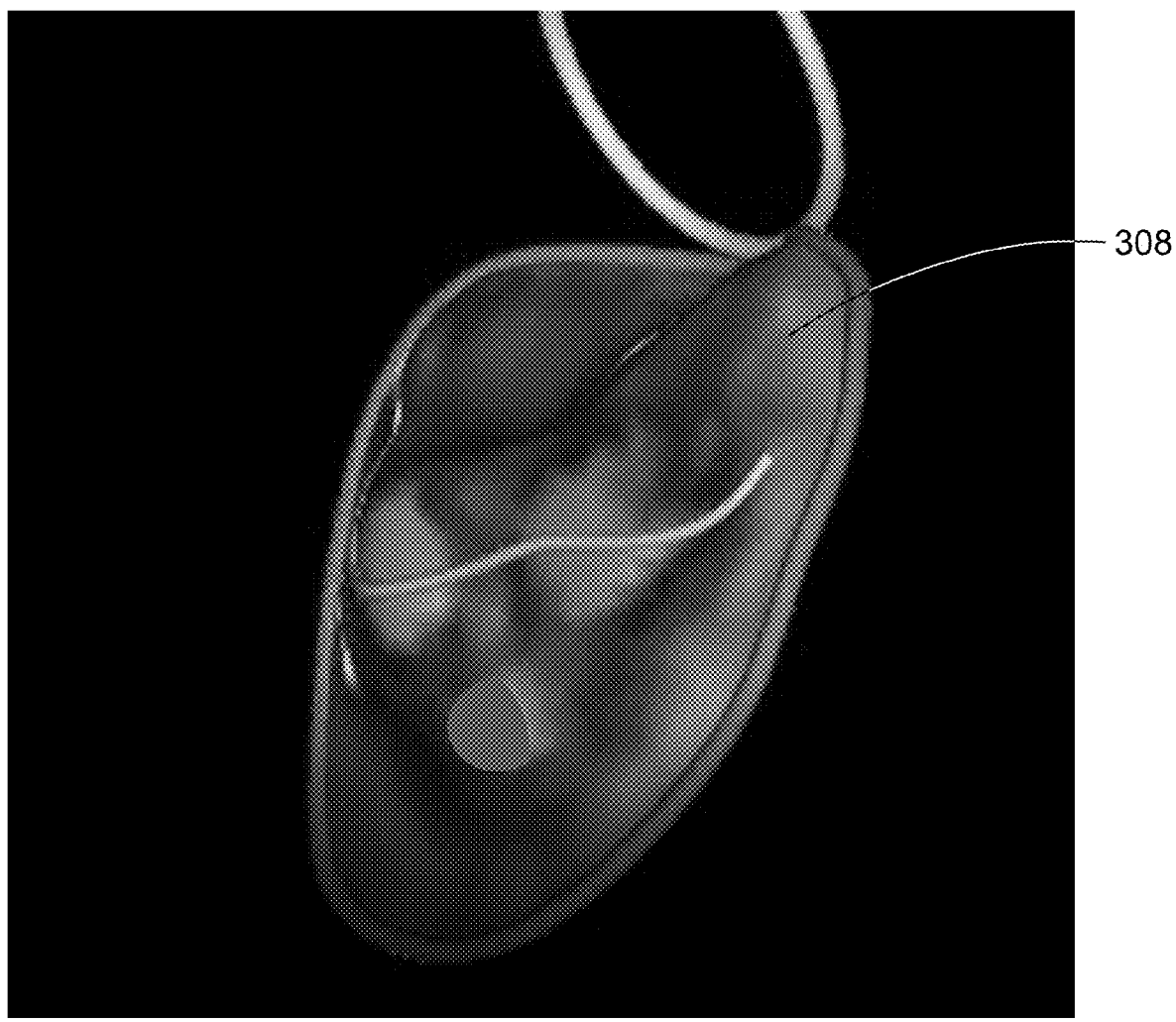
FIG. 6 is a representation of a colorized surface rendering in accordance with an embodiment.

The processor 116 may be configured to rotate the colorized surface rendering 308, thereby changing the view direction of the colorized surface rendering 308 that is displayed on the display device 118. FIG. 6 is a representation of the colorized surface rendering 308 from a second view direction in accordance with an embodiment. The second view direction represented in FIG. 6 is different from the first view direction represented in FIG. 4 and is shown to help show the three dimensional shape of the anatomical surface 310. FIG. 4 and FIG. 6 both show a representation of the same colorized surface rendering 308. The colorized surface rendering 308 includes a coaptation line 311 in accordance with an exemplary embodiment. The coaptation line 311 represents the location where the anterior and posterior mitral valve leaflets touch each other during systole. According to various embodiments, the shape and location of the coaptation line 311 may be calculated by the processor 116. Other embodiments may not display a coaptation line. The ability to rotate the colorized surface rendering 308, as demonstrated by FIGS. 4 and 6, provides the clinician with the ability to easily understand the shape of the anatomical surface 310 represented by the colorized surface rendering 308. The clinician may control the rotation of the colorized surface rendering 308 by interacting with the user interface 115.

Figure 7:
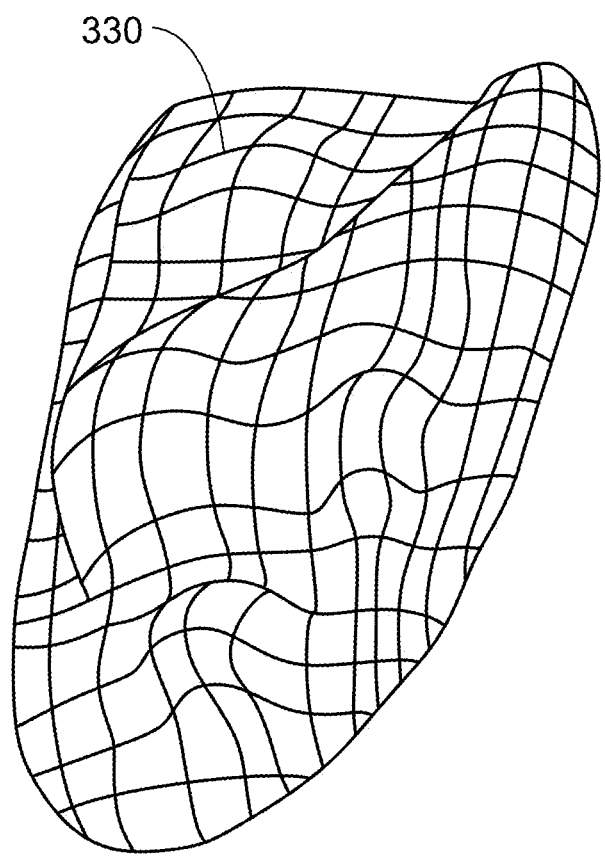
FIG. 7 is a representation of a wireframe in accordance with an embodiment.

FIG. 7 is a representation of the wireframe 330 of the anatomical surface 310 from the same view direction as shown in FIG. 6. The wireframe 330 shown in FIG. 7 is provided to show the three dimensional shape of the anatomical surface 310 represented by the colorized surface rendering 308.

Figure 8:
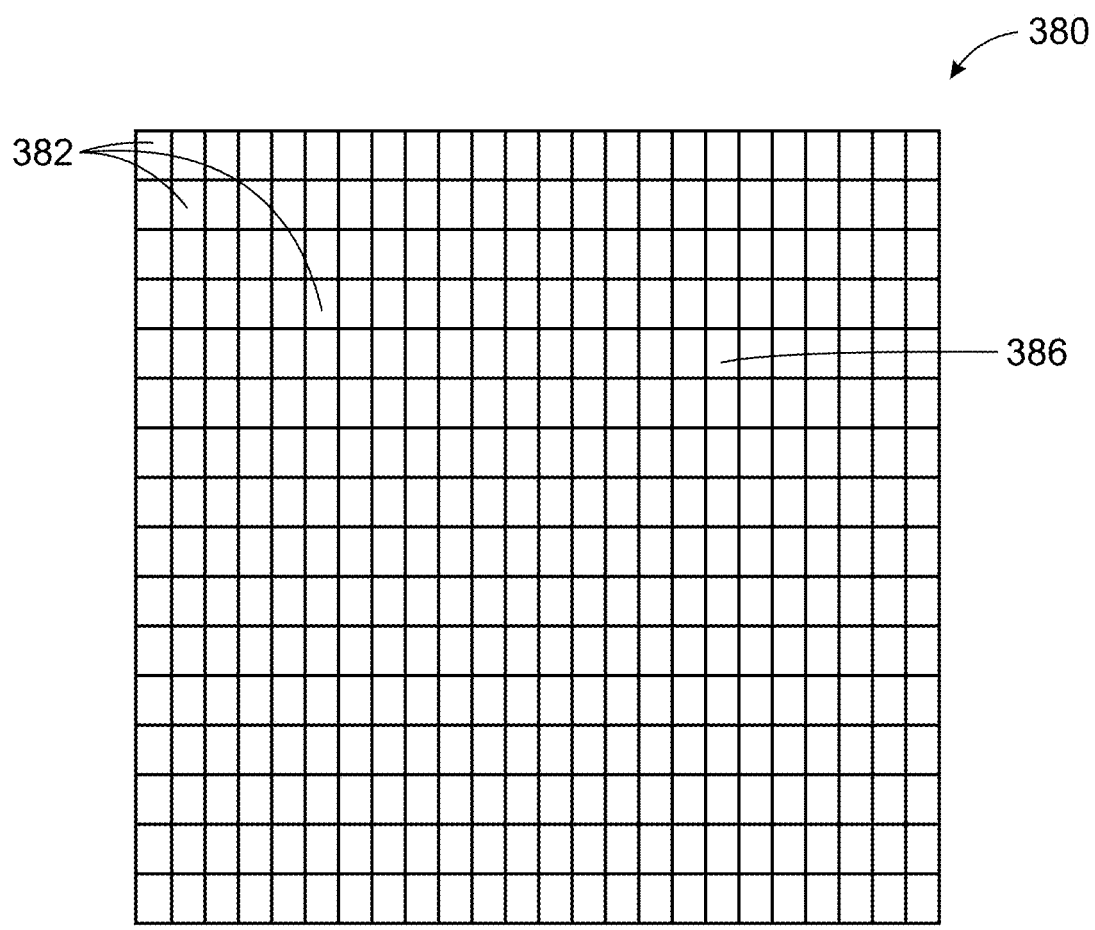
FIG. 8 is a schematic representation of a plurality of discrete regions according to an embodiment.

FIG. 8 is a schematic representation of a plurality of discrete regions 382 from area 380 of the colorized surface rendering 308 shown in FIG. 4. Each discrete region 382 may be assigned a color to represent information from the functional ultrasound dataset. Each of the plurality of discrete regions 382 is assigned a single color to represent information from the functional ultrasound dataset sampled from one or more locations in the functional ultrasound dataset. Each discrete region 382 may include one pixel or a plurality of connected pixels according to various embodiments. The discrete regions are not represented in color in FIG. 8 in order to make it the boundaries of the individual discrete regions easier to visualize. Each discrete region 382 is shown as rectangular in FIG. 8, but could be other shapes according to various embodiments. FIG. 8 includes discrete region 386, which corresponds to the point 410 shown on FIG. 4.

The colorized surface rendering 308 is generated so the shape of the colorized surface rendering 308 corresponds with and represents the shape of the anatomical surface 310 (as determined based on the anatomical ultrasound dataset). Each of the discrete regions 382 in the colorized surface rendering 308 may be assigned a color to represent information from the functional imaging dataset. For example, the colorized surface rendering 308 includes a first blue region 340, a second blue region 342, a first orange region 344, and a second orange region 346. The first blue region 340 includes a first plurality of discrete regions, the second blue region 342 includes a second plurality of discrete regions, the first orange region 344 includes a third plurality of discrete regions, and the second orange region 346 includes a fourth plurality of discrete regions. There are a range of shades of blue within the first blue region 340 and the second blue region 340. There are also a range of shades of orange within the first orange region 344 and the second orange region 346. The colorized surface rendering 308 shown in FIG. 4 also includes a non-colorized region 348. The colorized surface rendering 308 is generating by assigning colors to a plurality of pixels, where the colors are selected to represent values from the functional imaging dataset. Additional information about how the colors for the colorized surface rendering 308 may be selected will be described hereinafter.

All of the discrete regions in the first blue region 340 and the second blue region 342 are assigned a color that is blue; and all of the discrete regions in the first orange region 344 and the second orange region 346 are assigned a color that is orange. As shown in FIG. 4, not all of the discrete regions within a discrete color region need to have exactly the same shade or hue of color. For example, the discrete regions within the first blue region 340 range from a light blue to a darker blue. Likewise, the discrete regions within the first orange region 344 range from a light orange to a dark orange. While blue and orange are provided as exemplary colors for the colors used in the colorized surface rendering, it should be appreciated that any color may be used according to various embodiments. For example, embodiments, may uses colors, including, but not limited to: red, orange, yellow, green, blue, purple, silver, etc. Furthermore, various embodiments may use colors that are a mixture of two or more of the previously listed colors. Such as, for example, red-orange, blue-green, green-purple, etc.

On the embodiment of the colorized surface rendering shown in FIG. 4, blue colors are mapped to regions of higher flow, while orange colors are mapped to regions of lower flow. As discussed previously, regions with either no flow, or with flow beneath a threshold, are not colorized in the colorized surface rendering 308. Therefore, the first blue region 340 and the second blue region 342 represent regions with relatively high flow values while the first orange region 344 and the second orange region 346 represent regions with relatively lower flow values.

According to an embodiment, the processor 116 may sample the functional ultrasound dataset at locations corresponding to the anatomical surface 310 identified during step 206 of the method 200. As such, the colorized surface rendering 308 may represent information from the functional ultrasound dataset at locations corresponding to the anatomical surface 310. According to other embodiments, the processor 116 may sample the functional ultrasound dataset at locations that are offset from the anatomical surface 310. As such, the colorized surface rendering may represent information from the functional ultrasound dataset at locations that are offset from the anatomical surface 310. For example, the locations from which the functional ultrasound dataset are sampled may be offset from the anatomical surface by any fixed amount, such as 0.5 mm, 1 mm, 1.5 mm, 2 mm, 2.5 mm 3, mm, etc., or by an automatically identified amount. The locations from which the functional ultrasound dataset are sampled may all be offset the same amount according to an embodiment. According to an embodiment, the locations from which the functional ultrasound dataset are sampled may be offset along a normal vector at each sampled location. According to an embodiment, the functional ultrasound dataset may be sampled at two or more different locations with respect to the anatomical surface 310 and the values from the functional ultrasound dataset may be combined or averaged. The color selected for each location on the colorized surface rendering 308 represents functional ultrasound data (from the functional ultrasound dataset) that is associated with each location. As discussed previously, the location of the functional ultrasound data represented by a color may be from a location corresponding to the anatomical surface 310, from a location that is offset from the location of the anatomical surface 310, or combined or averaged from a plurality of locations that may correspond with the anatomical surface 310 and/or be offset from the anatomical surface 310. For embodiments that combine or average functional ultrasound data from a plurality of locations for each discrete region on the colorized surface rendering 308, one of the plurality of locations may correspond to the anatomical surface 310 and one or more of the plurality of location may be offset from the anatomical surface 310, or each of the plurality of locations may be offset from the anatomical surface 310.

According to an exemplary embodiment, the processor 116 may be configured to automatically detect a position of a jet. For example, the processor 116 may be configured to use image processing techniques to identify the position of the jet. For example, according to an embodiment, the processor 116 may be configured to find the area with highest flow and and/or segment an area/region with flow above a threshold value to identify the position of the jet. According to another embodiment, the processor 116 may be configured to identify the position of the jet using artificial intelligence techniques. Artificial intelligence techniques may include machine learning techniques, deep learning techniques, such as the use of a convolutional neural network (CNN), or any other artificial intelligence technique. The processor 116 may be further configured to graphically indicate a region in the colorized surface rendering 308 corresponding to a location of the jet identified by the processor 116. FIG. 4 includes a jet region 377 that is shown in purple according to an exemplary embodiment. The jet region 377 may be represented using another color according to various embodiments. Other embodiments may not include the automatic identification of a jet region, such as the jet region 377.

Figure 9:
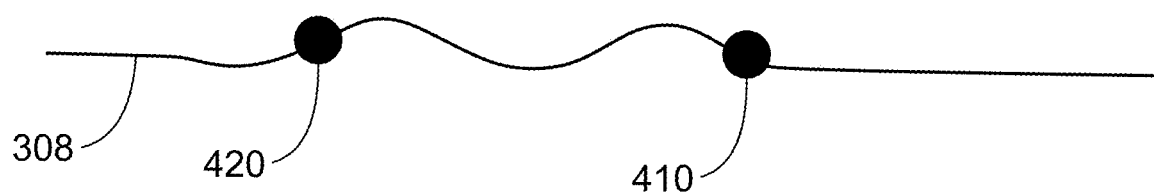
FIG. 9 is a sectional view of a colorized surface rendering in accordance with an embodiment.

FIG. 9 represents a sectional view of the colorized surface rendering 308 along the line A-A' (shown in FIG. 4). FIG. 9 illustrates how the colorized surface rendering 308 is not flat along the line A-A'. FIG. 9 includes point 410 and point 420, both of which are shown in FIG. 4 as well. The sectional view of the colorized surface rendering 308 corresponds to the anatomical surface 310 along the line A-A' as well.

Figure 10:
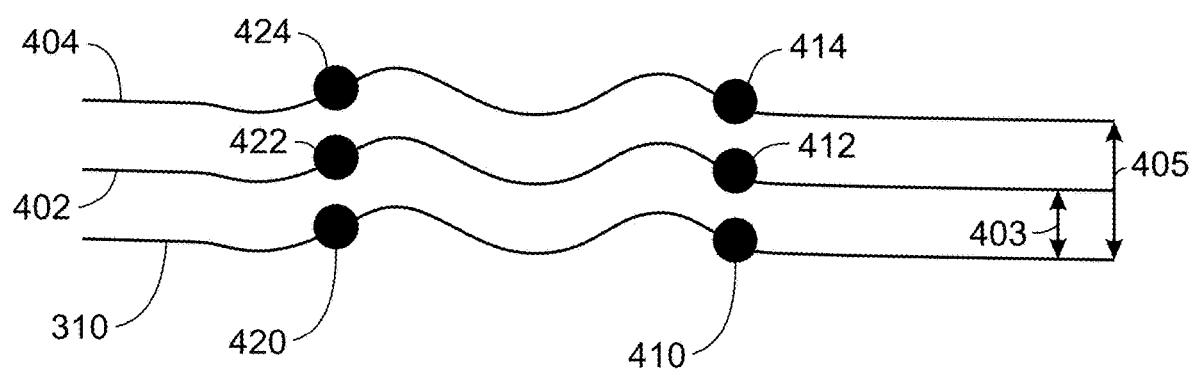
FIG. 10 is a sectional view of an anatomical surface and two offset surfaces in accordance with an embodiment.

FIG. 10 shows a sectional view of the anatomical surface 310, a first offset surface 402, and a second offset surface 404. The sectional view of the anatomical surface 310 shown in FIG. 10 corresponds to the sectional view of the colorized surface rendering 308 along the line A-A' (shown in FIG. 4), which is why the sectional view of the anatomical surface 310 shown in FIG. 10 looks the same as the sectional view of the colorized surface rendering 308 shown in FIG. 9. The points 410 and 420 are shown with respect to the anatomical surface 310 in FIG. 10. The first offset surface 402 is offset from the anatomical surface 310 by a first distance 403 and the second offset surface 404 is offset from the anatomical surface 310 by a second distance 405. According to an embodiment, the processor 116 may be configured to sample the functional ultrasound data at locations that are offset from the anatomical surface 310. According to an embodiment, the processor 116 may be configured to sample the functional imaging dataset at location that are offset a fixed distance from the anatomical surface 310. For example, the processor 116 may be configured to sample the functional ultrasound dataset at point 412 for the discrete region of the colorized surface rendering 308 corresponding to the point 410. The processor 116 may be configured to sample the functional ultrasound dataset at point 422 for the discrete region on the colorized surface rendering 308 corresponding to the point 420. The color assigned to the colorized surface rendering 308 at the discrete region corresponding to the point 410 may therefore be selected to represent the value of the functional ultrasound dataset at the point 412 and the color assigned to the colorized surface rendering 308 at the discrete region corresponding to the point 420 may be selected to represent the value of the functional ultrasound dataset at the point 422. This example represents an embodiment where the processor 116 is configured to sample the functional ultrasound dataset at locations that are offset from the anatomical surface 308 by a first distance 403. The distance and/or the direction of the offset may be manually selected by the operator via an input through the user interface 115, or the distance and/or the direction of the offset may be determined automatically. For example, the direction and/or distance of the offset may be predetermined, or it may be calculated by the processor 116 based on the selected anatomical surface. For example, according to an embodiment, the processor 116 may determine an average normal direction to the anatomical surface 310 by averaging normal vectors calculated at a plurality of positions on the anatomical surface 310. According to an embodiment, the processor 116 may calculate the average normal direction by averaging normal vectors calculated for each location on the anatomical surface 310 for which a functional ultrasound data value will be calculated. It should be appreciated that other embodiments may calculate or determine an average normal direction using other techniques.

According to various embodiments, the processor 116 may be configured to sample the functional ultrasound dataset at locations that are offset from the anatomical surface 308 by a fixed distance. The processor 116 may be configured to sample the functional ultrasound dataset at point 414 for the discrete region of the colorized surface rendering 308 corresponding to the point 410. The processor 116 may be configured to sample the functional ultrasound dataset at point 424 for the discrete region on the colorized surface rendering 308 corresponding to the point 420. The color assigned to the colorized surface rendering 308 at the discrete region corresponding to the point 410 may therefore be selected to represent the value of the functional ultrasound dataset at the point 414 and the color assigned to the colorized surface rendering 308 at the discrete region corresponding to the point 420 may be selected to represent the value of the functional ultrasound dataset at the point 424. This example represents an embodiment where the processor 116 is configured to sample the functional ultrasound dataset at locations that are offset from the anatomical surface 308 by the second distance 405.

According to various embodiments, for each discrete region 382 of the colorized surface rendering 308, the processor 116 may be configured to combine or average values sampled from two or more locations in the functional ultrasound dataset. For example, the processor 116 may be configured to sample the functional ultrasound dataset at points 412 and 414 for the discrete region of the colorized surface rendering 308 corresponding to the point 410. The processor 116 may be configured to sample the functional ultrasound dataset at points 422 and 424 for the discrete region on the colorized surface rendering 308 corresponding to the point 420. The color assigned to the colorized surface rendering 308 at the discrete region corresponding to the point 410 may therefore be selected to represent an average of the value of the functional ultrasound dataset at the point 412 and the value of the functional ultrasound dataset at the point 414; and the color assigned to the colorized surface rendering 308 at the discrete region corresponding to the point 420 may be selected to represent an average of the value of the functional ultrasound dataset at the point 422 and the value of the functional ultrasound dataset at the point 424. This example represents an embodiment where the processor 116 is configured to average samples obtained from the functional ultrasound dataset at locations that are offset from the anatomical surface 308 by the first distance 403 and the second distance 405.

Figure 11:
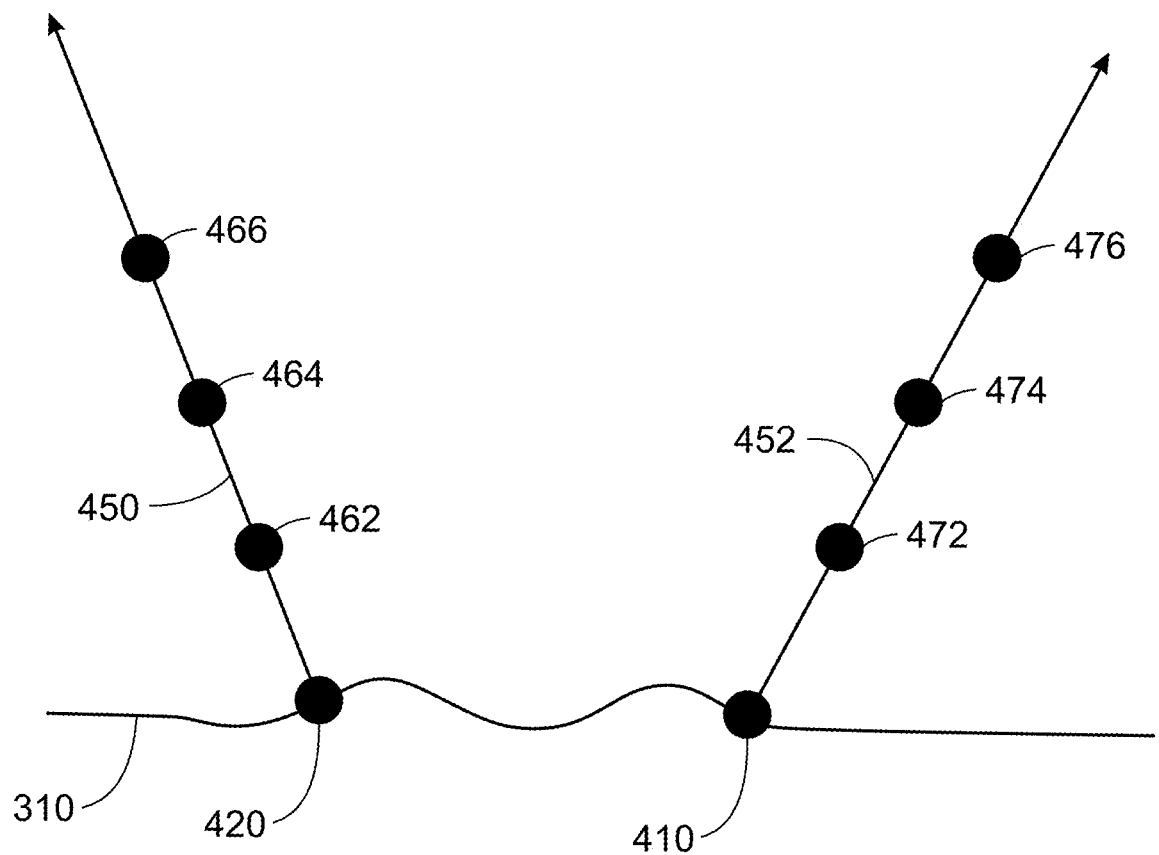
FIG. 11 is a sectional view of an anatomical surface and two normal vectors in accordance with an embodiment.

FIG. 11 is a sectional view of the anatomical surface 310 and two normal vectors in accordance with an embodiment. The points 410 and 420 are shown with respect to the anatomical surface 310 in FIG. 11. FIG. 11 includes a first normal vector 450 and a second normal vector 452. The first normal vector 450 is perpendicular to the anatomical surface 310 at point 420, and the second normal vector 452 is perpendicular to the anatomical surface 310 at point 410. As discussed previously, the processor 116 may be configured to determine an offset for each point on the anatomical surface 310 by first calculating a normal vector at each point. The processor 116 may then sample the functional ultrasound dataset at one or more points that are offset from the anatomical surface 310 in a direction along the respective normal vector. For example, for a discrete region of the colorized surface rendering 308 corresponding to point 420, which is on the anatomical surface 310, the processor 116 may be configured to sample the functional ultrasound dataset at one or more points that are offset along the first normal vector 450, such as point 462, point 464, and/or point 466. For a discrete region of the functional ultrasound dataset corresponding to the point 410, which is on the anatomical surface 310, the processor 116 may be configured to sample the functional ultrasound dataset at one or more points that are offset along the second normal vector 452, such as point 472, point 474, and/or point 476. As with the previously described embodiment, the processor 116 may be configured to calculate an average based on values sampled from multiple different offsets. For example, for the discrete region corresponding to the point 420, the processor 116 may be configured to average two or more of the values sampled from the functional ultrasound dataset at locations corresponding to point 420, 462, 464, and/or 466. Likewise, for the discrete region corresponding to the point 410, the processor 116 may be configured to average two or more of the values sampled from the functional ultrasound dataset at locations corresponding to point 410, 472, 474, and/or 476. While only two normal vectors are shown on FIG. 11, it should be appreciated that the techniques described with respect to FIG. 11 may be used to calculate the values for each discrete region 382 that is colorized on the colorized surface rendering 308.

According to an embodiment, the processor 116 may be configured to identify either a maximum value (i.e., a maximum intensity projection) from the functional dataset along a ray or a minimum value (i.e., a minimum intensity projection) from the functional dataset along a ray and then colorize the corresponding discrete region 382 of the colorized surface rendering to represent this maximum or minimum value. All of the rays may be parallel according to an embodiment. The rays may be converging according to an embodiment. The rays may be diverging according to an embodiment. According to other embodiments, each of the rays may be perpendicular to the anatomical surface 310. The rays used for determining a maximum value or a minimum value may correspond to the normal vectors, such as the normal vectors 450 and 452, or the rays may all be parallel and in a direction of the desired offset according to various embodiments. Maximum intensity projection and minimum intensity projections are well-know for other volume rendering applications so they will not be described in additional detail.

As discussed previously, the colorized surface rendering 308 includes a plurality of discrete regions 382. While FIG. 8 only shows discrete regions 382 from within the area 380, it should be appreciated that the discrete regions 382 extend over the entire colorized surface rendering 308. Each of the plurality of discrete regions 382 on the colorized surface rendering 308 may be assigned a unique color based on the value sampled from the functional ultrasound dataset at a location corresponding to that particular discrete region. According to an exemplary embodiment, generating the colorized surface rendering 308 may involve accessing a look-up table with the processor 116 and assigning colors to each of the discrete regions 382 based on colors assigned based on the look-up table. According to an exemplary embodiment, FIG. 4 includes a color scale 379. The color scale 379 includes a visual representation of the values associated with various colors. The exemplary color scale 379, for instance, maps colors to values between and including 0.33 m/s (shown at the top of the color scale) to a value of −0.98 (shown at the bottom of the color scale).

For a non-limiting example where the identified surface is a triangular surface mesh (not shown), each of a plurality of vertex locations may correspond to a discrete region 382 in the colorized surface rendering 308. It should be appreciated that the colors may be mapped to the various discrete regions 382 on the colorized surface rendering 308 using other techniques according to various embodiments. According to some embodiments, such as the one shown in FIG. 4, functional ultrasound data values from the functional ultrasound dataset that are below a threshold value may not be colorized. Discrete regions in the colorized surface rendering 308 that are not colorized may be shown in greyscale. For example, the colorized surface rendering 308 includes the non-colorized region 348 which is represented in greyscale. The greyscale values selected for the non-colorized region 348 may be greyscale values as determined during a B-mode imaging mode. For example, the greyscale values for the non-colorized region 348 may be computed using offset, maximum intensity projection (MIP), minimum intensity projection (MinIP), or any other sampling method. According to some embodiments, the processor 116 may be configured to apply shading and or highlighting to the colorized surface rendering 348 in order to help visually convey information about the shape of the three-dimensional surface represented by the colorized surface rendering 308.

At step 210, the processor 116 is configured to display the colorized surface rendering 308 on a display device. At step 212, a determination is made about whether or not it is desired to access additional ultrasound data. If it is desired to access additional ultrasound data at step 212, the method 200 returns to step 202. Or, if it is not desired to process additional ultrasound data at step 212, the method 200 advances to step 214, where the method 200 ends. According to an embodiment, the method 200 may be performed in real-time as the patient is being scanned. If, for example, there is additional ultrasound data to process at step 212, the method 200 may return to step 202. In this manner, the steps 202, 204, 206, 208, 210, and 212 may be iteratively repeated as many times as necessary or desired. According to an embodiment, the method 200 may go from step 212 to 202 if it is desired to access an additional anatomical ultrasound dataset and an additional functional ultrasound dataset. According to an embodiment, the method 200 may iteratively perform steps 202, 204, 206, 208, 210, and 212 as long as additional anatomical ultrasound data and functional ultrasound data are being acquired during the scanning process.

The method 200 may be performed in real-time as additional frames/volumes of anatomical ultrasound data and additional frames/volumes of functional ultrasound data are acquired. For example, the processor 116 may perform steps 202, 204, 206, 208, and 210 in real-time as each additional frame/volume of anatomical ultrasound data and each additional frame/volume of functional ultrasound data becomes available. In this way, the colorized surface rendering that is generated at step 208 and displayed at step 210 represents information from the most recently processed volume of anatomical ultrasound data and the most recently processed volume of functional ultrasound data. Each colorized surface rendering generated and displayed by implementing one iteration of steps 202, 204, 206, 208, and 210 may be one frame of a dynamic colorized surface rendering. The dynamic colorized surface rendering displays a plurality of different image frames in a sequence, similar to cine loop. However, in the dynamic colorized surface rendering, each of the plurality of different image frames is a colorized surface rendering generated from a different/updated anatomical ultrasound dataset and a different/updated functional ultrasound dataset. While the dynamic colorized surface rendering was described according to an embodiment where the data is being acquired in real-time, in other embodiments, the processor 116 may be configured to generate a dynamic colorized surface rendering based on both anatomical ultrasound datasets that were previously acquired and stored and functional ultrasound datasets that were previously acquired and stored. The method will generate an updated colorized surface rendering each time the method 200 performs an iteration of steps 202, 204, 206, 208, and 210. For embodiments where the method 200 is being performed while anatomical and functional ultrasound datasets are being acquired, the colorized surface rendering displayed in the dynamic colorized surface rendering represents information from the most recently acquired anatomical ultrasound dataset and the most recently acquired functional ultrasound dataset.

According to an embodiment, the processor 116 may be configured to generate and display the colorized surface rendering 308 in real-time during an ultrasound procedure. One example of generating and displaying the colorized surface rendering 308 in real-time is when the colorized surface rendering is a frame of a dynamic colorized surface rendering. For example, as discussed hereinabove, the processor 116 may be configured to calculate and display an updated colorized surface rendering 308 based on the most recently acquired anatomical ultrasound data and the most recently acquired functional ultrasound data. As a result, the colorized surface rendering 308, which represents the surface of the valve according to an exemplary embodiment, is updated so that it is always correctly positioned with respect to the anatomical surface based on the most recently acquired anatomical ultrasound dataset and the most recently acquired functional ultrasound dataset. For embodiments where the anatomical surface is a valve, the valve surface typically exhibits significant motion throughout the patient's cardiac cycle. In embodiments that generate and display the colorized surface rendering in real-time as part of a dynamic colorized surface rendering, the colorized surface rendering 308 is updated so the anatomical surface represented in the colorized surface rendering 308 being displayed always includes the valve, even when the position of the valve is moving over time. This enables the clinician to see the color flow dynamic during all phases of the heart, including systole. This would not be possible using conventional techniques where a single plane, at a fixed location, is imaged because the plane would be at a different distance from the valve in the various images acquired throughout the patient's cardiac cycle. Furthermore, having a colorized surface rendering that tracks an anatomical surface of the patient through multiple frames is easier and more convenient for the clinician. Instead of generating images from a fixed plane, the colorized surface rendering may be updated with each additional frame of ultrasound data so that it always represents the anatomical surface. This makes it easy and convenient for the clinician to study and interpret the functional image data associated with that particular anatomical surface. The clinician does not need to manually adjust the position of the imaging plane and the colorized surface rendering shows more of the surface than would be possible with a conventional planar acquisition.

Additionally, the processor 116 may be configured to adjust the view angle of the colorized surface rendering 308 in response to control inputs from the user interface 115. For example, the processor 116 may be configured to rotate the colorized surface rendering 308 to enable the clinician to view the colorized surface rendering 308 from any desired view direction. FIG. 4 shows an example of the colorized surface rendering 308 from a first view direction while FIG. 6 shows an example of the colorized surface rendering 308 from a second view direction that is different than the first view direction. By controlling the view direction, such as by controlling the rotation and/or the translation of the colorized surface rendering 308, the clinician may view and examine the colorized surface rendering 308 in one or more desired directions in order to make an accurate clinical assessment of the patient and in order to get a more accurate understanding of the position of the values of the functional ultrasound dataset with respect to the anatomical structure 310 represented in the colorized surface rending 308.

Figure 12:
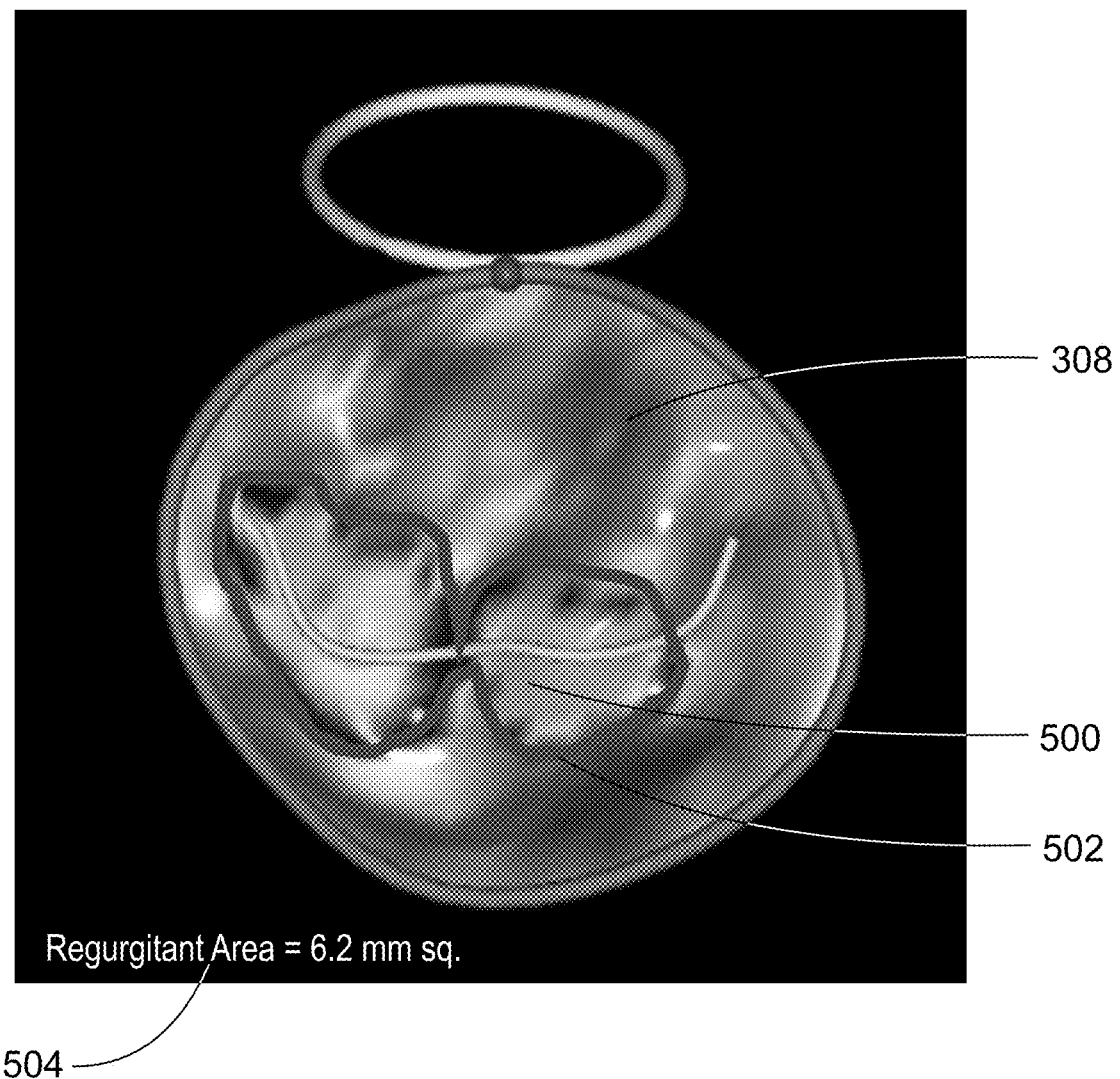
FIG. 12 is a representation of a screenshot showing a colorized surface rendering in accordance with an embodiment.

According to an embodiment, the volume of interest may include a heart valve with a regurgitant jet. FIG. 12 is a representation of a screenshot showing the colorized surface rendering 308 with a segmented regurgitant region 500. For example, the processor 116 may be configured to identify the regurgitant region 500 within the colorized surface rendering 308. The processor 116 may be configured to identify the regurgitant region 500 using any number of techniques, including one or more of the following: a connected component analysis, a thresholding technique, and/or an artificial intelligence technique. For example, the processor 116 may be configured to identify and segment the regurgitant region 500 using a trained neural network or using other image processing techniques such as thresholding and/or a connected component analysis. FIG. 12 includes a boundary 502 displayed about identified regurgitant region 500. The processor 116 may be configured to calculate an area of the regurgitant region 500 and display the area of the regurgitant region 500 on the display device 118. For example, the screenshot 500 includes the text string 504 that reads: "Regurgitant area=6.2 mm sq." to convey that the area of the regurgitant region 500 is 6.2 $mm^2$. The processor 116 may be configured to identify and segment the regurgitant region 500 automatically or the processor 116 may be configured to identify and segment the regurgitant region 500 in response to a user command via the user interface 115. Likewise, the processor 116 may be configured to calculate and display the regurgitant area automatically or the processor 116 may be configured to calculate and display the regurgitant area in response to a user command via the user interface 115.

Figure 13:
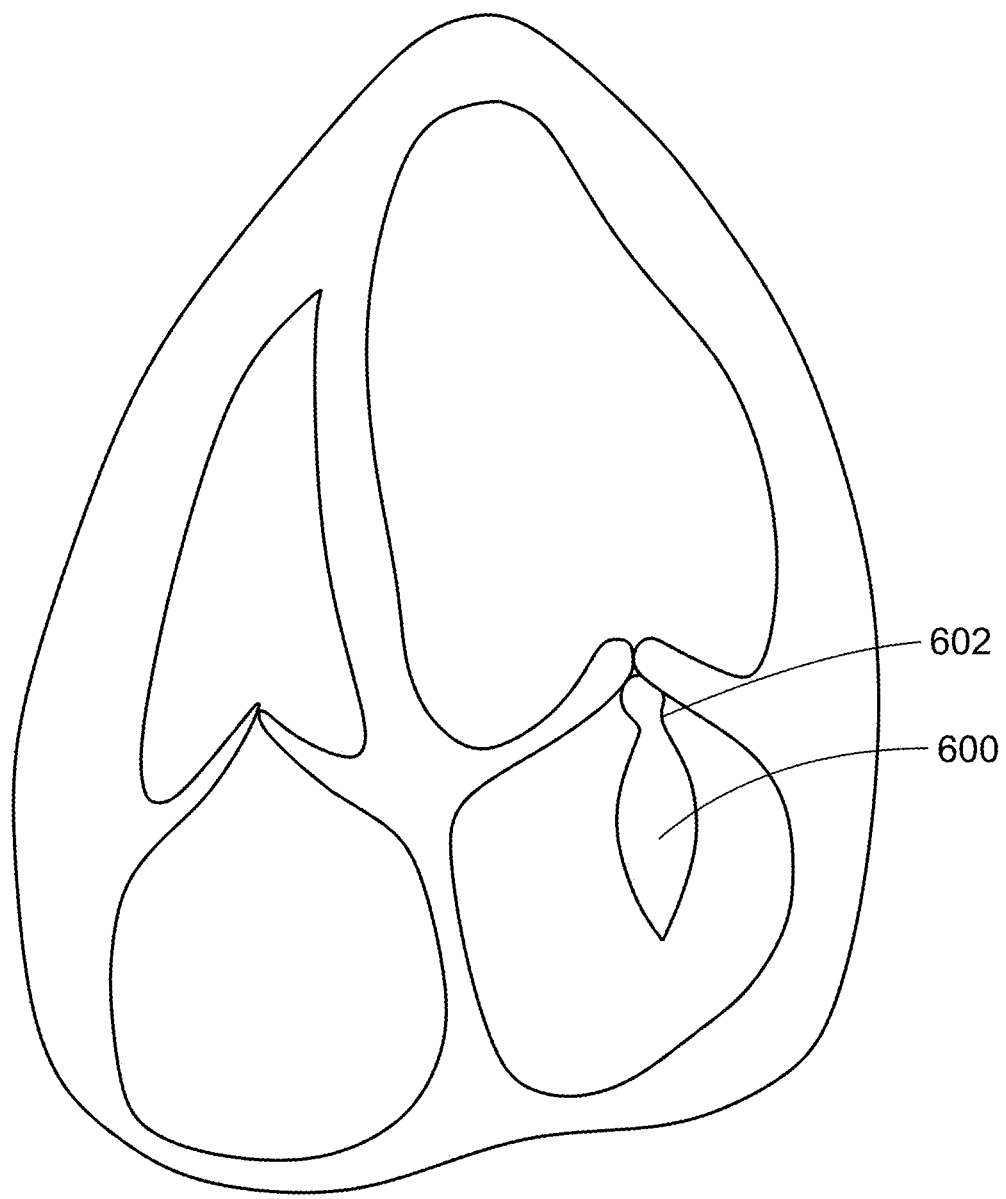
FIG. 13 is a representation of a regurgitant jet in accordance with an embodiment.

FIG. 13 is a representation of a regurgitant jet 600 in accordance with an exemplary embodiment. A vena contracta 602 is shown on the regurgitant jet 600. The vena contracta is the point in the jet where the diameter of the jet is at a minimum value. According to an embodiment, the processor 116 may be configured to select an offset for sampling the functional ultrasound dataset so that the offset corresponds with the vena contracta. In other words, the processor 116 may be configured to select the offset for sampling the functional ultrasound dataset so that the functional ultrasound dataset is sampled at a distance from the anatomical surface 310 that corresponds with the location of the vena contracta with respect to the anatomical surface 310. Clinically, this is done because the area of the vena contracta is relatively independent of the loading conditions (i.e., the blood pressure in the various cardiac chambers), flow rate, and orifice shape. As a result, setting the distance from the anatomical surface 310 to be the distance of the vena contracta from the anatomical surface 310 is considered a robust parameter to characterize the severity of the valve regurgitation. Sampling the offset to correspond with the vena contracta may be done by selecting, with the processor 116, the offset to minimize a cross-sectional area of the regurgitant jet 600.

Generating and displaying a colorized surface rendering, wherein the colorized surface rendering is colorized to represent information from the functional ultrasound dataset provides numerous advantages. As discussed within the background of the invention section, conventional solutions for visualizing both anatomical and functional ultrasound data at the same time have significant limitations. Generating and displaying a colorized surface rendering, wherein the colorized surface rendering is colorized to represent information from the functional ultrasound dataset overcomes many of these limitations.

For example, generating and displaying a colorized surface rendering makes it easy for the clinician to easily and clearly view both anatomical ultrasound data, which is present in the shape of the anatomical surface represented by the colorized surface rendering and functional ultrasound data, which is present in the colorization of the colorized surface rendering. Directly colorizing a surface rendering to generate a colorized surface rendering ensures that the display of the functional ultrasound data does not obscure the anatomical data of the anatomical surface 310. As discussed in the background of the invention section, using conventional techniques to generate a single volume-rendering including both anatomical ultrasound data and functional ultrasound data, can make interpretation difficult for the clinician because the volume rendering of ultrasound data, such as structures or flow, in the foreground can either completely or partially obscure volume-rendered ultrasound data (functional ultrasound data and/or anatomical ultrasound data) in the background. For example, rendered tissue that is closer to the viewer can partially or completely block flow information, from the color flow dataset, that is further from the viewer. Or, conversely, rendered color flow data can block anatomical information that is further from the viewer. This makes it very difficult for the clinician to accurately understand the information in both the anatomical ultrasound dataset and the functional ultrasound dataset. Generating and displaying a colorized surface rendering solves this limitation of conventional techniques because, in the colorized surface rendering, the representation of the functional ultrasound dataset does not block or obscure the representation of the anatomical ultrasound dataset, and the representation of the anatomical ultrasound dataset does not block or obscure the representation of the functional ultrasound dataset. Having a colorized surface rendering 308 of an anatomical surface 310, wherein the anatomical surface 310 is colorized to represent information from the functional ultrasound dataset, enables the clinician to clearly see and understand both the values of the functional ultrasound dataset (based on the colorization) and the shape of the anatomical surface 310 (based on the shape represented by the colorized surface rendering) at the same time.

An advantage of embodiments of the present invention is that the clinician is provided with the ability to easily rotate and/or translate the colorized surface rendering 308. This allows the clinician the ability to easily manipulate the view direction of the colorized surface rendering 308 so the clinician can quickly and easily understand both the shape of the anatomical surface 310 and the values of the functional ultrasound dataset based on the colorization of the colorized surface rendering 308 at each discretely sampled location on the colorized surface rendering 308. When used with cardiac applications, the present invention provides the clinician with an improved technique for quickly and positively identifying various cardiac issues including, but not limited to, identifying regurgitant jets on a valve surface, identifying mal-coaptations, identifying paravalvular leaks, identifying clefts, identifying septal leaks, etc.

According to an embodiment, a method for rendering volumetric ultrasound data includes accessing, with a processor, an anatomical ultrasound dataset including a volume-of-interest. The method includes accessing, with the processor, a functional ultrasound dataset including the volume-of-interest. The method includes identifying, with the processor, an anatomical surface from the anatomical ultrasound dataset, wherein the anatomical surface is a three-dimensional non-planar surface. The method includes generating, with the processor, a colorized surface rendering of the anatomical surface, wherein the colorized surface rendering is colorized to represent information from the functional ultrasound dataset. The method includes displaying the colorized surface rendering on a display device.

According to an embodiment, the anatomical ultrasound dataset is a B-mode dataset and the functional ultrasound dataset is a color flow Doppler dataset.

According to an embodiment, the colorized surface rendering is colorized to represent information from the functional ultrasound dataset at locations corresponding to the anatomical surface.

According to an embodiment, the colorized surface rendering is colorized to represent information from the functional ultrasound dataset at locations that are offset from the anatomical surface.

According to an embodiment, the colorized surface rendering includes a plurality of discrete color regions, and the method further includes assigning each of the plurality of discrete color regions to a color based on an average of information from the functional ultrasound dataset corresponding to two or more different locations with respect to the anatomical surface.

According to an embodiment, the two or more different locations are located along a normal vector with respect to each of the plurality of discrete color regions.

According to an embodiment, the colorized surface rendering includes a plurality of discrete regions, and the method further includes assigning each of the plurality of discrete regions a color based on one of a maximum value along a normal vector or a minimum value along the normal vector.

According to an embodiment, displaying the colorized surface rendering is performed in real-time during an ultrasound procedure.

According to an embodiment, the colorized surface rendering is a frame of a dynamic colorized surface rendering.

According to an embodiment, the volume-of-interest includes a heart valve with a regurgitant jet, and the method further includes: segmenting, with the processor, a regurgitant region from the colorized surface rendering; calculating an area of the regurgitant region; displaying the area of the regurgitant region; and displaying the area of the regurgitant region on the display device.

In am embodiment, the volume-of-interest includes a heart valve with a regurgitant jet, and the method further includes selecting, with the processor, the offset to minimize a cross-sectional area of the regurgitant jet.

In an embodiment, an ultrasound imaging system includes an ultrasound probe, a display device, and a processor in electronic communication with both the ultrasound probe and the display device. The processor is configured to access an anatomical ultrasound dataset including a volume-of-interest. The processor is configured to access a functional ultrasound dataset including a volume-of-interest. The processor is configured to identify an anatomical surface from the anatomical ultrasound dataset, wherein the anatomical surface is a three-dimensional non-planar surface. The processor is configured to generate a colorized surface rendering of the anatomical surface, wherein the colorized surface rendering is colorized to represent information from the functional ultrasound dataset. The processor is configured to display the colorized surface rendering on the display device.

In an embodiment, the anatomical ultrasound dataset is a B-mode dataset and the functional ultrasound dataset is a color flow Doppler dataset.

In an embodiment, the colorized surface rendering is colorized to represent information from the functional ultrasound dataset at locations corresponding to the anatomical surface.

In an embodiment, the colorized surface rendering is colorized to represent information from the functional ultrasound dataset at locations that are offset from the anatomical surface.

In an embodiment, the colorized surface rendering includes a plurality of discrete color regions, and the processor is further configured to assign each of the plurality of discrete color regions to a color based on an average of information from the functional ultrasound dataset corresponding to two or more different locations with respect to the anatomical surface.

In an embodiment, the two or more different locations are located along a normal vector with respect to each of the plurality of discrete color regions.

In an embodiment, the colorized surface rendering includes a plurality of discrete regions, and wherein the processor is further configured to assign each of the plurality of discrete regions a color based on one of a maximum value along a normal vector or a minimum value along the normal vector.

In an embodiment, the processor is further configured to display the colorized surface rendering in real-time during an ultrasound procedure.

In an embodiment, the colorized surface rendering is a frame of a dynamic colorized surface rendering.

In an embodiment, the volume-of-interest includes a heart valve with a regurgitant jet, and the processor is further configured to: segment a regurgitant region from the colorized surface rendering; calculate an area of the regurgitant region; and display the area of the regurgitant region on the display device.

In an embodiment, the volume-of-interest includes a heart valve with a regurgitant jet, the processor is further configured to select the offset to minimize a cross-sectional area of the regurgitant jet.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method for rendering volumetric ultrasound data, the method comprising:

accessing, with a processor, an anatomical ultrasound dataset including a volume-of-interest;

accessing, with the processor, a functional ultrasound dataset including the volume-of-interest;

identifying, with the processor, an anatomical surface from the anatomical ultrasound dataset, wherein the anatomical surface is a three-dimensional non-planar surface;

generating, with the processor, a colorized surface rendering of the anatomical surface, wherein the colorized surface rendering is colorized to represent information from the functional ultrasound dataset; and displaying the colorized surface rendering on a display device, wherein the colorized surface rendering is colorized to represent information from the functional ultrasound dataset at locations that are offset from the anatomical surface.

2. The method of claim 1, wherein the anatomical ultrasound dataset is a B-mode dataset and wherein the functional ultrasound dataset is a color flow Doppler dataset.

3. The method of claim 1, wherein the colorized surface rendering is colorized to represent information from the functional ultrasound dataset at locations corresponding to the anatomical surface.

4. The method of claim 1, wherein the colorized surface rendering comprises a plurality of discrete regions, and wherein the method further comprises assigning each of the plurality of discrete regions a color based on one of a maximum value along a normal vector or a minimum value along the normal vector.

5. The method of claim 1, wherein said displaying the colorized surface rendering is performed in real-time during an ultrasound procedure.

6. The method of claim 5, wherein the colorized surface rendering is a frame of a dynamic colorized surface rendering.

7. The method of claim 1, wherein the volume-of-interest includes a heart valve with a regurgitant jet, wherein the method further comprises:
   segmenting, with the processor, a regurgitant region from the colorized surface rendering;
   calculating an area of the regurgitant region; and
   displaying the area of the regurgitant region on the display device.

8. The method of claim 1, wherein the volume-of-interest includes a heart valve with a regurgitant jet, wherein the method further comprises:
   selecting, with the processor, the offset to minimize a cross-sectional area of the regurgitant jet.

9. A method for rendering volumetric ultrasound data, the method comprising:
   accessing, with a processor, an anatomical ultrasound dataset including a volume-of-interest;
   accessing, with the processor, a functional ultrasound dataset including the volume-of-interest;
   identifying, with the processor, an anatomical surface from the anatomical ultrasound dataset, wherein the anatomical surface is a three-dimensional non-planar surface;
   generating, with the processor, a colorized surface rendering of the anatomical surface, wherein the colorized surface rendering is colorized to represent information from the functional ultrasound dataset; and
   displaying the colorized surface rendering on a display device, wherein the colorized surface rendering comprises a plurality of discrete regions, and wherein the method further comprises assigning each of the plurality of discrete regions to a color based on an average of information from the functional ultrasound dataset corresponding to two or more different locations with respect to the anatomical surface.

10. The method of claim 9, wherein the two or more different locations are located along a normal vector with respect to each of the plurality of discrete regions.

11. An ultrasound imaging system comprising:
   an ultrasound probe;
   a display device; and
   a processor in electronic communication with both the ultrasound probe and the display device,
   wherein the processor is configured to:
      access an anatomical ultrasound dataset including a volume-of-interest;
      access a functional ultrasound dataset including the volume-of-interest;
      identify an anatomical surface from the anatomical ultrasound dataset, wherein the anatomical surface is a three-dimensional non-planar surface;
      generate a colorized surface rendering of the anatomical surface, wherein the colorized surface rendering is colorized to represent information from the functional ultrasound dataset; and
      display the colorized surface rendering on the display device, wherein the colorized surface rendering comprises a plurality of discrete regions, and wherein the processor is further configured to assign each of the plurality of discrete regions a color based on one of a maximum value along a normal vector or a minimum value along the normal vector.

12. The ultrasound imaging system of claim 11, wherein the anatomical ultrasound dataset is a B-mode dataset and wherein the functional ultrasound dataset is a color flow Doppler dataset.

13. The ultrasound imaging system of claim 11, wherein the colorized surface rendering is colorized to represent information from the functional ultrasound dataset at locations corresponding to the anatomical surface.

14. The ultrasound imaging system of claim 11, wherein the colorized surface rendering is colorized to represent information from the functional ultrasound dataset at locations that are offset from the anatomical surface.

15. The ultrasound imaging system of claim 14, wherein the volume-of-interest includes a heart valve with a regurgitant jet, wherein the processor is further configured to select the offset to minimize a cross-sectional area of the regurgitant jet.

16. The ultrasound imaging system of claim 11, wherein the processor is further configured to display the colorized surface rendering in real-time during an ultrasound procedure.

17. The ultrasound imaging system of claim 16, wherein the processor is configured to display the colorized surface rendering as a frame of a dynamic colorized surface rendering.

18. The ultrasound imaging system of claim 11, wherein the volume-of-interest includes a heart valve with a regurgitant jet, wherein the processor is further configured to:
   segment a regurgitant region from the colorized surface rendering;
   calculate an area of the regurgitant region; and
   display the area of the regurgitant region on the display device.

* * * * *